Patented Jan. 8, 1952

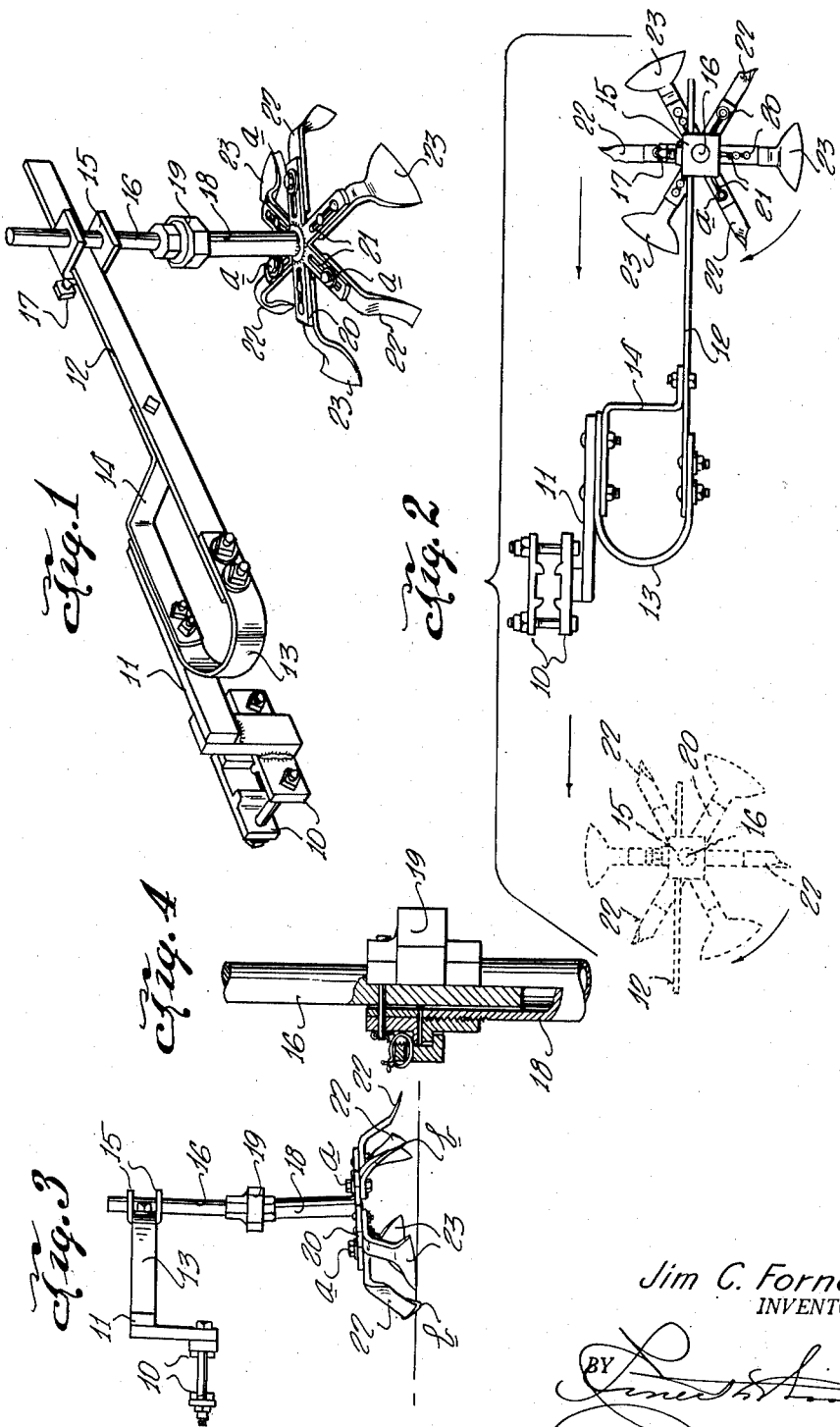

2,581,642

UNITED STATES PATENT OFFICE 2,581,642

COTTON CHOPPING AND WEEDING DEVICE

Jim C. Forney, Chilton, Tex.

Application March 28, 1949, Serial No. 83,953

1 Claim. (Cl. 97—17)

This invention relates to row crop weeding and thinning devices and more particularly to a rotary cotton chopping and thinning attachment for tractors and cultivators.

The principal object of the invention is to provide a device consisting of a spider mounted on rotatable, inclined shank and equipped with a plurality of longitudinally slotted, radial arms adapted to carry alternately a cutting blade and a traction shoe, the arrangement being such that due to the inclination of the shank to the vertical, the traction shoes will be brought successively into engagement with the soil and will thus propel the spider and bring the cutting blades successively into the row of plants thereby thinning and weeding the same.

Another object of the invention is to provide a cotton chopping and weeding device as set forth in which the slots in the arms of the spider are provided so that radial adjustments of the traction shoe and blades may be made to increase or decrease the distance between stands of cotton in a row.

With the foregoing objects in view, the invention has further reference to certain features of accomplishment which will become apparent as the description proceeds, taken in connection with the accompanying drawing wherein:

Figure 1 is a perspective view of a rotary cotton chopper and thinning attachment, constructed according to the invention.

Figure 2 is a top plan view showing two positions of the rotary element, one position being shown in dotted lines.

Figure 3 is a front elevational view of the attachment, and

Figure 4 is a fragmentary elevational view of the supporting shank, partly in section, showing a swivel coupling through which the rotary element revolves.

Continuing with a more detailed description of the drawing, reference numeral 10 denotes a pair of coupling members by which the chopping and thinning attachment is secured to the beam of a cultivator or to a tractor. To one of the clamp members 10 is affixed a bar 11 and to the bar 11 in turn, is bolted a beam 12, through connecting members 13 and 14.

Adjustably mounted on the beam 12 is a U-clamp 15, the horizontally disposed legs of which are provided with aligned holes through which extends the upper end of a shaft 16, the latter being held stationary by means of a bolt 17 which latter bends the clamp 15 on the shaft 16.

The lower end of the shaft 16 enters the upper end of a hollow shank 18 and a sectional coupling 19 shown in Figure 4 joins the shaft and shank together so that the latter may rotate. The coupling 19 is of conventional manufacture.

The invention consists of a spider welded or otherwise secured to the lower end of the shank 18 and whose radial arms 20 are each provided with a longitudinal slot 21. Attached to alternate arms 20 of the spider by means of bolts a are metal straps 22 whose outer ends are curved downwardly and pointed at b. To the remaining arms 20 of the spider are similarly attached a series of cutting blades 23. The blades 23 are also curved downwardly but are likewise curved slightly outward as shown.

In Figure 3 it will be observed that the shank 18 is slightly inclined to the vertical so that the rotary element will be tilted with respect to the ground, as shown. As the device is drawn along a row of vegetables, a point b of a traction member 22 will be brought into engagement with the soil and will cause rotation of the spider to bring a blade 23 in an arc across the row of vegetation, cutting a swath therefrom. As the device continues its linear travel, the next succeeding shoe 22 will engage the soil, followed by the next succeeding blade 23. This operation continues with the traction shoes and blades being brought into successive engagement with the soil and row of plants, resulting in the latter being left with equally spaced stands, in which the spacing is determined by adjusting the shoes 22 and blades 23 on the arms 20 of the spider.

It is evident from the foregoing that not only will the rotary blades thin the row of vegetation but will also remove a certain amount of weeds intermingled with the plants. Those weeds on each side of the row of plants escaping the action of the blades 23 are removed by the cultivator plows used in conjunction with the invention.

Manifestly, the construction as shown and described is capable of some modification and such modification as may be construed to fall within the scope and meaning of the appended claim is also considered to be within the spirit and intent of the invention.

What is claimed is:

A cotton chopping and weeding attachment for a tractor including a mounting detachably connected to said tractor, a rotary shank attached to and inclined downwardly from said mounting, a spider affixed to the lower end of said shank having a plurality of radial and longitudinally slotted arms, a traction shoe attached to alternate arms of said spider, each having a downwardly turned, soil engaging outer end, a series of chopping and thinning blades, each having a shank attached to a remaining arm of said spider, said thinning blades being adapted to be brought successively into operative engagement with a row of plants as said traction shoes are brought successively into engagement with the soil adjacent said plants and means carried by each of said traction shoes and blade shanks and engageable with the slots of said spider arms to effect radial adjustment of said traction shoes and blades.

JIM C. FORNEY.

REFERENCES CITED

The following references are of record in the file of this patent:

UNITED STATES PATENTS

| Number | Name | Date |
|---|---|---|
| 952,826 | Ludwick | Mar. 22, 1910 |
| 1,021,228 | Ayers | Mar. 26, 1912 |
| 1,616,225 | Kloo | Feb. 1, 1927 |